Jan. 25, 1955     A. G. GRAM ET AL     2,700,347

IMPROVEMENT IN REFRIGERATING APPARATUS

Filed Feb. 5, 1951     8 Sheets-Sheet 1

INVENTORS
A. G. Gram
+ Nana Gram
By Watson, Cole, Grindle + Watson

Jan. 25, 1955   A. G. GRAM ET AL   2,700,347
IMPROVEMENT IN REFRIGERATING APPARATUS
Filed Feb. 5, 1951   8 Sheets-Sheet 2

Fig.3.

INVENTORS
A. G. Gram
& Hans Gram
By Watson, Cole, Grindle & Watson

Jan. 25, 1955   A. G. GRAM ET AL   2,700,347
IMPROVEMENT IN REFRIGERATING APPARATUS
Filed Feb. 5, 1951   8 Sheets-Sheet 5

INVENTORS
A. G. Gram + Hans Gram
By Watson, Cole, Grindle + Watson

Jan. 25, 1955  A. G. GRAM ET AL  2,700,347
IMPROVEMENT IN REFRIGERATING APPARATUS
Filed Feb. 5, 1951  8 Sheets-Sheet 6

INVENTORS
A. G. Gram & Hans Gram
By Watson, Cole, Grindle & Watson

Jan. 25, 1955     A. G. GRAM ET AL     2,700,347
IMPROVEMENT IN REFRIGERATING APPARATUS
Filed Feb. 5, 1951     8 Sheets-Sheet 7

INVENTORS
A. G. Gram & Hans Gram
By Watson, Cole, Grindle & Watson

Jan. 25, 1955  A. G. GRAM ET AL  2,700,347
IMPROVEMENT IN REFRIGERATING APPARATUS
Filed Feb. 5, 1951  8 Sheets-Sheet 8

INVENTORS
A. G. Gram & Hans Gram
By Watson, Cole, Grindle & Watson

United States Patent Office 2,700,347
Patented Jan. 25, 1955

2,700,347

IMPROVEMENT IN REFRIGERATING APPARATUS

Aage Gudmund Gram and Hans Gram, Vojens, Denmark, assignors to Brodrene Gram A/S, Vojens, Denmark, a joint-stock company of Denmark Application February 5, 1951, Serial No. 209,365

11 Claims. (Cl. 107—8)

The present invention relates to certain improvements in refrigerating apparatus for freezing fluid material into shaped bodies, and more especially to apparatus of the kind referred to comprising an annular rotary vessel which has a number of annular rows of freezing pockets and is separated into a plurality of segments, adapted each to be alternately supplied with a cooling medium and a thawing medium, and comprising a device for filling portions of said fluid medium into said pockets and a further device for inserting sticks into the material in said pockets and a take-off device for removing the frozen bodies from the said pockets.

A continuous operation of an apparatus of the kind referred to depends obviously upon a thawing of the superficial layer of the frozen bodies in the freezing pockets to such degree that the adhesion of said bodies to the wall of the freezing pockets is destroyed in order to enable nippers, forming parts of the take-off device and arranged to grip the sticks inserted in the said bodies, to elevate the frozen bodies from said pockets when shifted axially in relation to a rotary member of the take-off device. If the thawing is insufficient, this being often the case in the hitherto known apparatus of the kind referred to, and the said nippers being unable to release from the sticks which have been gripped by the nippers, further operation of the take-off device is prevented, the rotary member of the latter being arranged to be driven, separately, from the same driving motor which drives the rotary vessel. The said motor would, however, continue the stepwise motion of the rotary vessel, and this circumstance may cause heavy damage upon the stopped take-off device, and may furthermore cause a heavy load on the driving motor.

It is not possible to eliminate the dependence between the operation of the take-off device and the operation of the stepwise rotating vessel, because these two important parts of the apparatus have to be operated synchronously with one another.

One object of the invention is to ensure that the operation of the rotary vessel is interrupted if the take-off device for any reason fails to operate. To this end the said rotary member of the take-off device is, according to the present invention, arranged immediately outside the periphery of the rotary vessel and geared to same, and the driving motor of the rotary vessel is coupled to said vessel by way of the rotary member of the take-off device. In this manner the stepwise motion of the rotary vessel is made dependent upon a satisfactory operation of the take-off device, and since the ratio of the gearing between the rotary vessel, having a very large diameter relative to the diameter of the rotary member of the take-off device, is large, the said driving motor may be a motor of such relatively small capacity, that the motor may be retarded without causing any heavy damage on the apparatus if the take-off device should fail to operate, e. g. for the reason referred to above. This is especially true if the said two rotary members of the apparatus are driven by hydraulic means, this being a further object of the invention, according to which an apparatus of the kind referred to is provided with a source of hydraulic pressure medium, a primary hydraulic motor operating the rotary member of the take-off device and the rotary vessel and a secondary hydraulic motor for operating a plurality of circumferentially spaced take-off bars slidably mounted in the rotary member of the take-off device and carrying the nippers, referred to above, axially in relation to the said rotary member, the supply of hydraulic pressure medium to said two hydraulic motors being controlled by a hydraulically operated valve so as to cause said two motors to operate alternately.

A further feature of the invention resides in the fact that in an apparatus of the kind referred to, comprising a stick-inserting device, operated by a separate hydraulic motor, means are provided for admitting hydraulic medium simultaneously to said separate hydraulic motor and the said secondary hydraulic motor to ensure that the stick-inserting device and the take-off bars of the take-off device are simultaneously operated, viz. in periods between consecutive rotary motions of the rotary vessel.

According to a still further feature of the invention a hydraulically operated coupling member may be arranged for coupling the hydraulic motor operating the rotary vessel and the rotary member of the take-off device to the said rotary member, when the supply of hydraulic driving medium to the hydraulic motor for operating the take-off bars of the take-off device and to the motor for operating the stick-inserting device, is interrupted. To this end the said hydraulic motor may be provided with a toothed coupling member mounted upon the piston of said motor and arranged to be displaced hydraulically transversely of the piston to engage teeth of said rotary member, when hydraulic driving medium is supplied to said hydraulic motor, which may comprise a primary cylinder, a primary piston slidable therein, an auxiliary cylinder carried by said primary piston and extending crosswise thereof, an auxiliary piston slidable in said auxiliary cylinder and carrying said coupling member, said auxiliary cylinder being connected to the source of hydraulic pressure by way of the primary cylinder and piston.

In an improved apparatus according to the present invention the device for filling fluid material into the freezing pockets may consist of a supply container for the material to be frozen, a substantially cylindrical measuring chamber mounted for rotation about a horizontal axis, adjacent the bottom of said container, said measuring member being constructed with a plurality of cylindrical measuring chambers extending crosswise therethrough, a piston slidably mounted in each of said measuring chambers, a continuously rotating motor, a gear transmission and a coupling connection between said motor and said measuring member and so arranged as to periodically rotate the latter through an angle of 180° to bring said measuring chambers into inverted position with said pistons at the top ends thereof, and means mounted in said supply container for pushing said pistons down through said measuring chambers when in said position, said means being operatively connected to said motor, said coupling connection extending through a downwardly open chamber provided between said supply container and said gear transmission.

Further features of the invention will be apparent from the following description, reference being had to the accompanying drawings in which.

Figure 1:
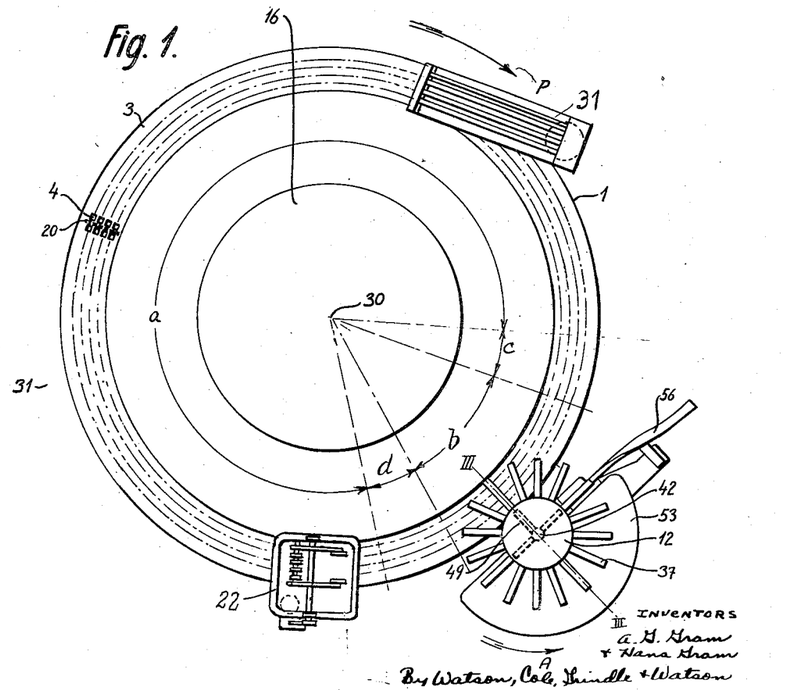
Figure 1 shows one example of the improved machine in plan view.
Figure 2:
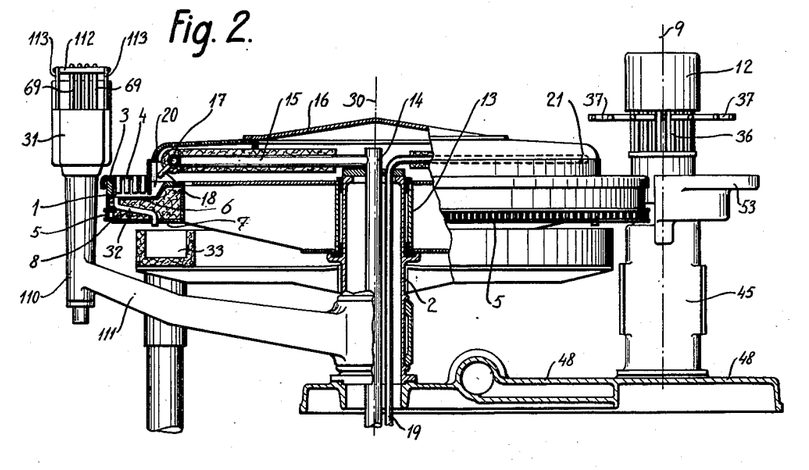
Figure 2 is a side elevation of same, partly in section.
Figure 5:
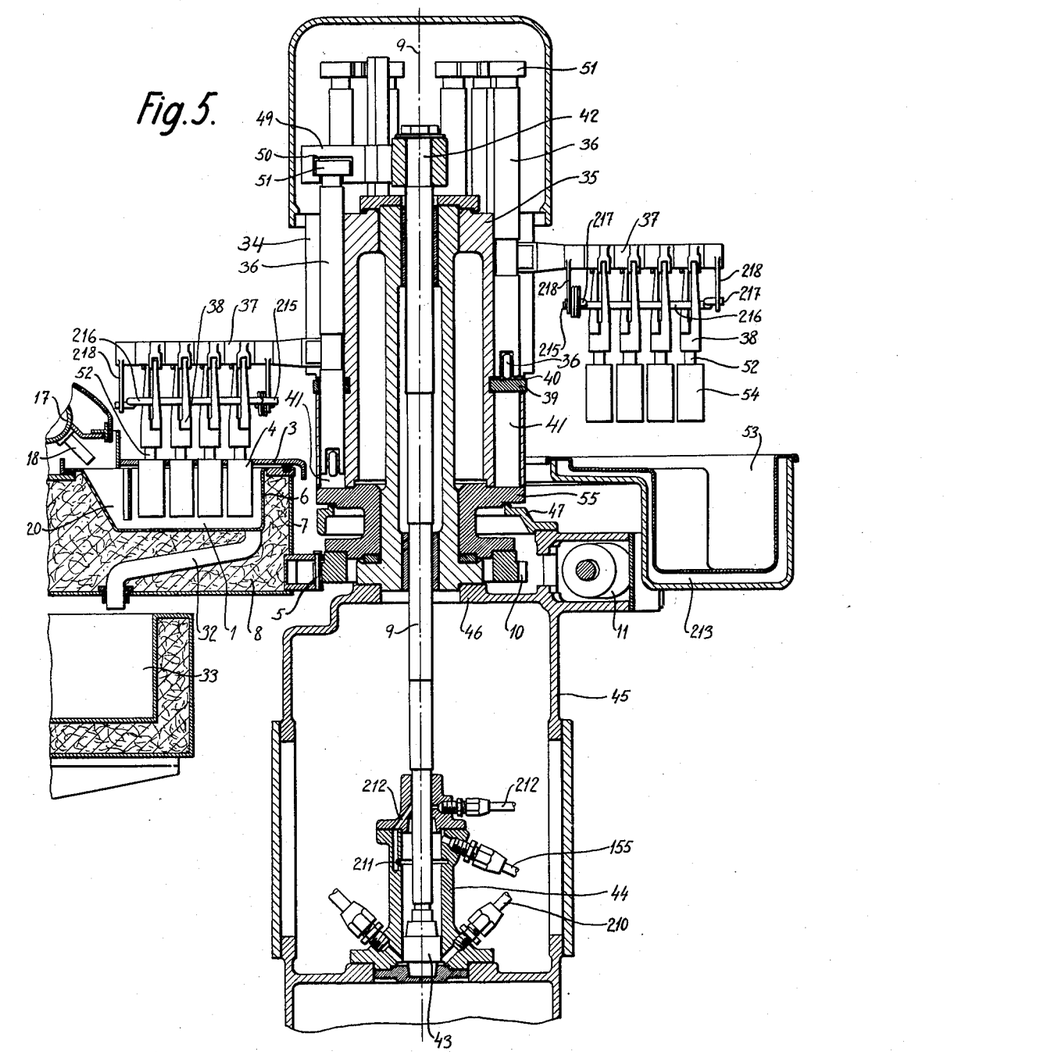
Figure 5 is a vertical section through the same device and adjacent parts of the freezing trough in section along the line III—III in Figs. 1 and 4.

In Figures 1 and 2, the reference numeral 1 designates double walls 6 and 7, Figs. 2 and 5, with an interposed heat-insulation 8, Fig. 5, consisting of a fibrous or porous material. The trough 1 is rotatable about a vertical hollow post 2, Fig. 2. The upward open side of the trough is covered with a cover 3 provided with a plurality—e. g. four as shown—of mutually concentric annular rows of recessed portions or so-called freezing pockets 4 which in the embodiment shown are of rectangular cross-sectional shape, but may have any other desired cross-sectional shape. The freezing pockets 4 in the various circular rows are arranged radially with respect to one another whereby all the annular rows will contain the same number of freezing pockets and will combine to form a plurality of radial rows. Between each two successive radial rows of freezing pockets the trough is provided with a partition 20, Figs. 1 and 2. These partitions divide the trough into a number of segments each of which contains four freezing pockets disposed in a radial row.

Figure 3:
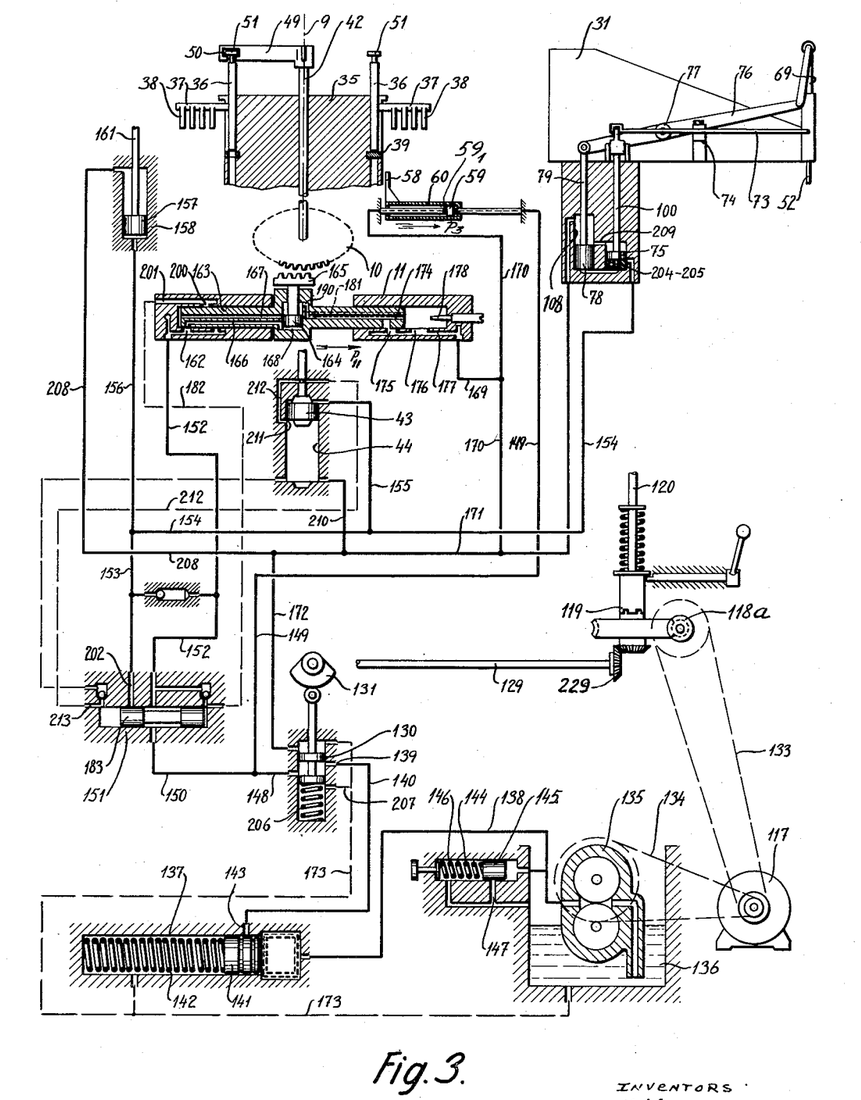
Figure 3 is a diagram of the hydraulic circuit of the machine.
Figure 4:
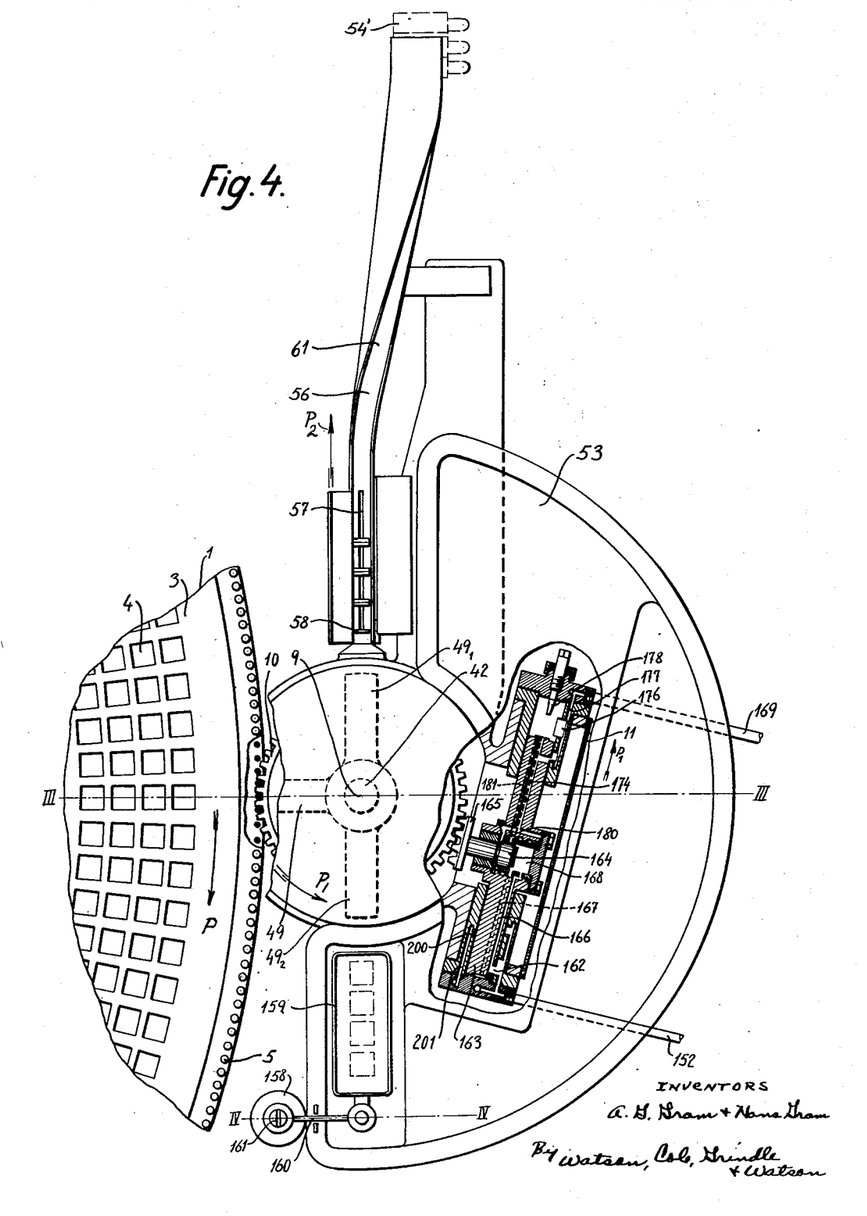
Figure 4 shows the device for withdrawing the frozen bodies from the freezing trough, and adjacent parts of the machine, in plan view with parts in section.

The annular trough is provided on its circumferential surface with a toothed rim 5, Figs. 2, 4 and 5, meshing with a gear-wheel 10 rotatable about a vertical axis 9, Figs. 2, 4 and 5. The gear-wheel 10 is rotated step by step by means of a hydraulic motor 11, Figs. 3–5, to be mentioned in further detail below, and is attached to a hub 55, Fig. 5, in rigid connection with a drum 35 of the device for withdrawing the frozen bodies, or take-off device 12, to be mentioned in further detail hereinafter.

The freezing pockets 4 extend down into the trough which during its stepwise rotation under the control of the hydraulic motor 11 first receives a freezing agent whereby cream filled into the freezing pockets 4 is frozen into solid bodies, as described in more detail hereinafter, and then a thawing agent for temporarily thawing a surface layer of the bodies as mentioned in the U. S. Patent No. 2,246,941, whereafter the frozen bodies are withdrawn from the freezing pockets by means of the take-off device 12, Figs. 1 and 2.

The annular trough 1 is constructed with a hub 13, Fig. 2, by means of which it is rotatably mounted on the hollow post 2. In a central position within the post there is disposed a stationary tube 14 for the supply of a cooling medium, such as cooled brine, which from this tube 14 flows through a radially disposed tube 15 to a distributing tube 17, Figs. 2 and 5, curved to form part of a circular ring extending over the angular zone a, Fig. 1, through which the freezing trough is rotated, while the freezing medium is being supplied.

A radially disposed tube 18 extends from the curved tube 17 to each of the trough segments, Figs. 2–5, through which tube 18 the cooling medium is caused to flow continuously into the segments of the trough 1 when said segments are in the angular zone a, Fig. 1.

The numeral 19 indicates a supply tube for a thawing medium, such as heated brine, which is likewise supplied to a tube 21, Fig. 2, shaped as part of a circle and extending over an angular zone b, Fig. 1, of the path of movement of the freezing trough. Radially disposed tubes exactly similar to the tubes 18, mentioned above, extend from the distributing tube 21 to the individual segments, and serve to supply the thawing medium to the trough segments at any time present in the angular zone b, Fig. 1, after these segments have automatically been emptied of freezing medium during the movement through the angular zone c, Fig. 1, as mentioned in the U. S. Patent No. 2,246,941. The take-off device 12 is arranged in the angular zone b, Fig. 1.

It may be mentioned that the number of radial partitions 20 may be smaller than the number of radial rows of freezing pockets, so that each trough segment will contain two or more radial rows of freezing pockets.

Figure 13:
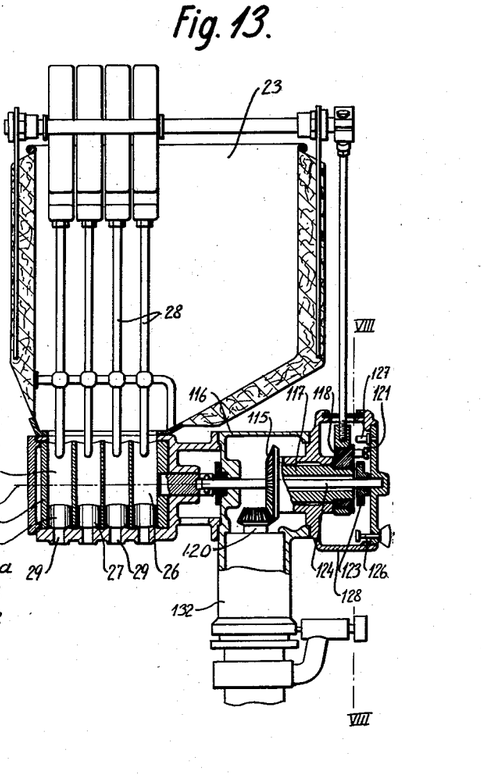
Fig. 13 is a vertical longitudinal section through the filling device along the line VII—VII of Fig. 14.
Figure 14:
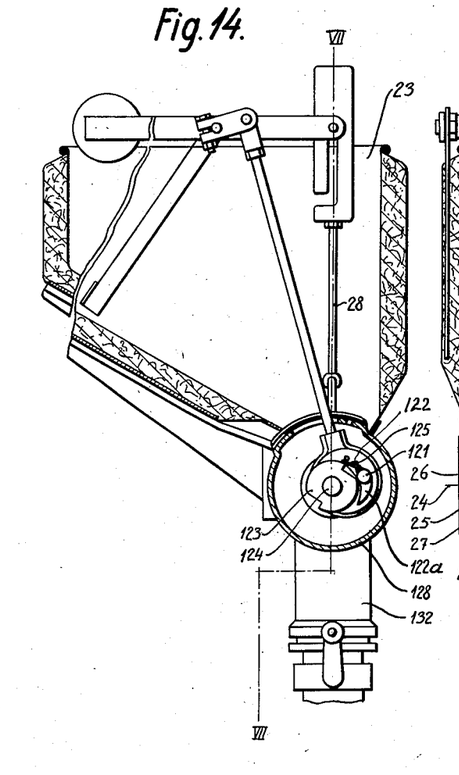
Fig. 14 is a vertical cross section through same in part along the line VIII—VIII of Fig. 13.

The freezing pockets are filled with liquid cream from a portioning and filling device 22, Fig. 1—the construction of which will be described below—liquid cream flowing from a hopper 23, Figs. 13 and 14, in the said device down into portioning chambers 26 in a cylindrical portioning member 25, which is rotatable about an axis 24 and has a number of portioning chambers 26 corresponding to the number of freezing pockets of a radial row, the portioning chambers being arranged side by side along the axis of rotation 21 of the portioning chamber and extending crosswise through said member. A piston 27 is slidably mounted in each of the portioning chambers.

In the operation of the device, the portioning member 25 is periodically turned through an angle of 180°, whereby the pistons 27 in the filled portioning chambers get into a position at the top of the latter. Under the influence of mechanically operated push-rods 28 the pistons press the portions of cream measured in the portioning chambers 25 out through discharge openings 29 and down into the freezing pockets at any time present thereunder.

When a radial row of freezing pockets has been filled with cream as above described, the freezing trough 1 is turned in the direction of the arrow P in Fig. 1 about the axis 30 through an angle corresponding to the angular spacing of two successive radial rows of freezing pockets, as will be described in more detail hereinafter, whereby the next radial row of freezing pockets is moved into filling position relative to the device 12. This stepwise rotation is periodically repeated at predetermined intervals as will be described in the following, and during this stepwise rotation the filled freezing pockets, under the influence of the cooling medium in the freezing trough 1, are first moved through the angular zone a, Fig. 1, past a device 31, Fig. 1, which will be hereinafter described, and which serves to insert flat wooden sticks into the partially frozen bodies of cream present in the freezing pockets 4 at the time of passing the said device, which will hereinafter be referred to as the stick inserting device, and then, after the sticks have been anchored in the bodies by the freezing thereof, the freezing pockets are moved into the smaller angular zone c, in which the cooling medium present in the trough segments around the freezing pockets is discharged by a syphon-action through a discharge tube 32, Figs. 2 and 5, and flows to a gutter 33, exactly as described in the U. S. Patent No. 2,246,941, whereafter during continued stepwise rotation of the freezing trough in the direction of the arrow P in Fig. 1, the freezing pockets are moved through the angular zone b, in which the trough segments are filled with a thawing medium, whereby the superficial layers of the frozen bodies present in the freezing pockets are thawed so that the bodies may in known manner be withdrawn from the freezing pockets by means of a device 12, the arrangement and function of which will be described below. Thereafter the freezing pockets are moved through an angular zone b, in which the thawing agent is discharged, whereafter the freezing pockets are again moved into the angular zone a and are supplied with cooling medium.

The filling of cream into the freezing pockets as well as the insertion of sticks into the partially frozen bodies and the withdrawal of the ready frozen bodies from the freezing pockets must be effected at times, when the freezing trough is stationary, or in other words in the intervals of rest between successive steps of the angular movement of the freezing trough.

The functions which the filling device 22, the stick inserting device 31, and the take-off device 12 are to perform must, therefore, be controlled in such a manner in dependency on the motor 11 serving to rotate the freezing trough step by step that rotation of the latter is excluded as long as the said three devices 22, 31, and 12 are in operation for filling the freezing pockets, inserting the sticks, and withdrawing the frozen bodies respectively. In machines of the kind described in U. S. Patent No. 2,246,941 this control is effected by mechanical means. It has however been found very difficult and complicated to provide a reliable control in this manner, and it has therefore been proposed to control the stick inserting device and the take-off device as well as the freezing trough by hydraulic means.

A hydraulic control of the functions of the said devices in dependency on the stepwise rotary movement of the freezing trough is also effected according to the present invention, though in a manner somewhat different from the previous proposal, such as will be described later with reference to the hydraulic circuit diagram shown in Fig. 3. However, before proceeding to the description of the hydraulic control means, the construction and arrangement of the above mentioned component devices will first be described.

The device 12, Fig. 1, for withdrawing the ready-frozen bodies is shown in vertical section is Fig. 5. This device comprises a drum 35 rotatable about a vertical axis 9 by means of the gear wheel 10, in which drum a number of sliding rods 36 disposed at uniform spacing along a circle around the axis 9 are slidably mounted in the axial direction. A radially disposed arm 37 is attached to each of the sliding rods 36 and extends through an axial slot 34 of the drum 35 and at its projecting portion carries a number of pairs of nippers 38 serving to withdraw the frozen bodies from the freezing pockets.

In the embodiment shown in Fig. 1, there are provided sixteen arms 37 and a corresponding number of sliding rods 36. At their bottom ends these rods engage an annular race 39, Fig. 5, consisting of a steel ring surrounding the drum 37 and accommodated in a circumferential groove 40 thereof. At the point of the circumference of this ring facing the freezing trough, the ring has a cut-away portion through which the sliding rod 36, which in any particular moment has been moved by rotation of the drum 35 about the axis 34 to the position in which the corresponding arm 37 extends over the freezing trough, may be moved further down in the drum in which each of the rods is received in a vertical guiding groove 41 as illustrated in Fig. 5. This lowering of the sliding rod 36 with the radial arm 37 and the nippers carried by the latter is effected by means of a lifting rod 42 which is centrally arranged in the drum 35 and is adapted to be moved up and down by means of a hydraulic piston 43 of a hydraulic motor consisting of said piston 43 and a cylinder 44. The said motor is arranged in a hollow post 45, on which the drum 35 is rotatably mounted, being guided by two circumferential collars 46 and 47 on the said post. The post itself rests on the foot piece 44, Fig. 2 of the machine. The lifting rod 42 is provided above the drum 45 with a radially disposed arm 49 extending radially towards the axis of rotation 30, Figs. 1, 4 and 5 of the freezing trough. The arm 49 is provided at its free end with a dove tail groove 50 open at the bottom face of the arm, and each of the sliding rods 36 is constructed at its upper end with a head 51 having a cross sectional shape corresponding to that of the groove 50. The dimensions of the head 51 are so much smaller than the dimensions of the groove 50 that the head 51 may be received in the groove 50 when the lifting rod 42 is in its topmost position, as shown in Fig. 3, and the drum 35, during the rotary movement thereof (as described below), moves in under the lifting arm 49. When this has taken place, the lifting rod 42 is lowered from the position shown in Fig. 3 to that shown in Fig. 5 and thereby moves the nippers 38 down to grip the sticks 52 of the bodies present in the freezing pockets at this time present radially opposite the take-off device 12.

Figures 6, 7, 8, 9:
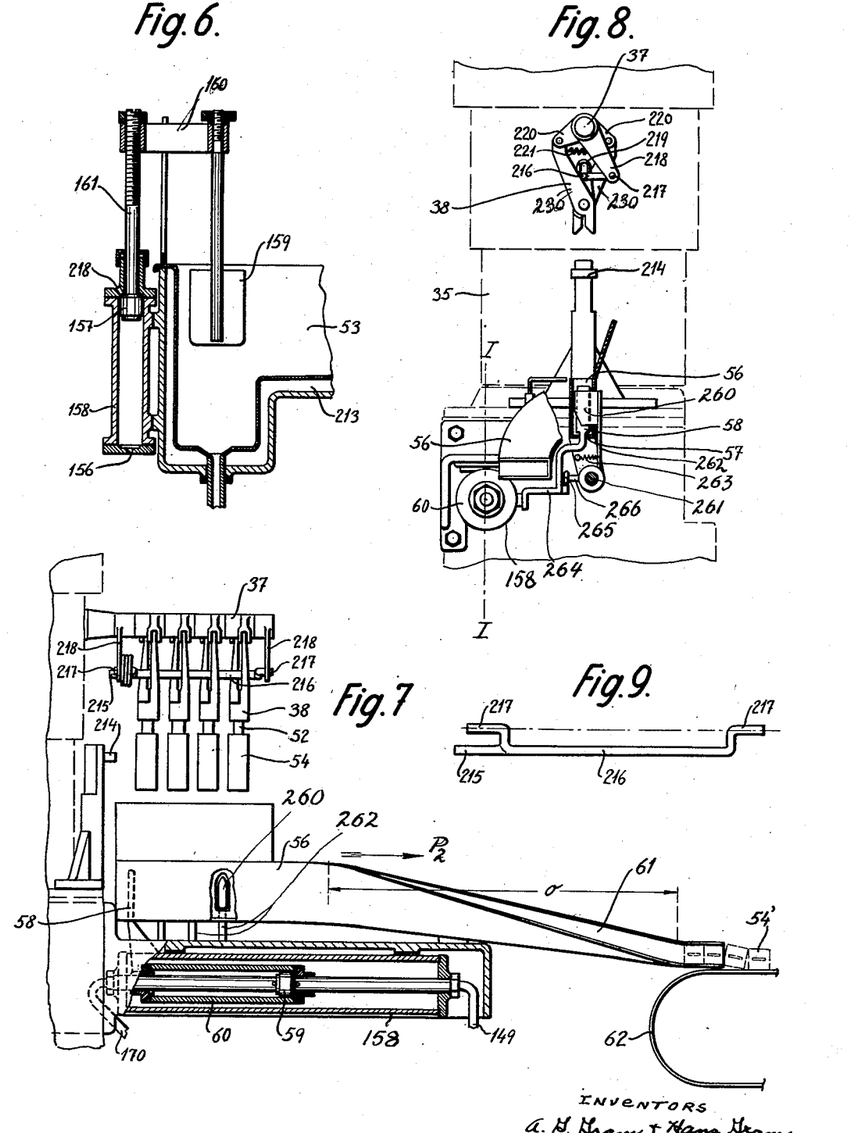
Figure 6 is a vertical section through parts of the same device along the line IV—IV in Fig. 4.
Fig. 7 shows part of the same device and an adjacent channel for depositing the frozen bodies, as viewed from the side with parts in section along the line I—I in Fig. 8.
Fig. 8 shows the same parts as viewed from the right hand side of Fig. 7.
Fig. 9 is a detail of same in top view.

During a subsequent upward stroke of the piston 43, the lifting rod 42 is moved upwards, whereby the nippers 38, which as shown at the left hand side of Fig. 5, have gripped the sticks 52, lift the relevant bodies out of the freezing pockets, the sliding rod 36 and the radial arm 37 being thereby lifted to the level of the sliding rod 36 and radial arm 37 shown at the right hand side of Fig. 5. During a number of subsequent steps of rotation of the freezing trough and the drum 35 the lifting rod 36 and radial arm 37 carrying the sticks are then moved in the direction indicated by the arrow $P_1$ in Fig. 4 to a position above a vessel 53 containing a coating material such as liquid chocolate with which the bodies 54 hanging in the sticks 52 may be provided with a chocolate layer by means of a scoop 159, Figs. 4–6. For this purpose, the sliding rod 36 when moved into position above the scoop 159, Fig. 4, is seized by a cross arm $49_2$, Fig. 4, extending from the lifting rod 42 at right angles to the lifting arm 49 and exactly similar to the latter, and under the influence of this arm is moved downwards in such a manner that the bodies depending from the radial arm 37 of the sliding rod in question are moved down into the scoop 159 while at the same time the latter is lifted up from the vessel 53 as will be mentioned in more detail hereinafter. At the same time a third cross arm $49_1$, Fig. 4, on the lifting rod 42 is moved down towards a channel 56 in which the frozen bodies withdrawn from the freezing pockets are deposited. To this effect the sliding rods 36, when successively moved in under the third cross arm $49_1$ on the lifting rod by the stepwise rotation of the drum 35, are seized by that cross arm and moved downwards, whereby the frozen bodies 54 depending from the nippers associated with the sliding rod in question are moved down into the channel 56, Figs. 1, 4 and 7, which is open at its top, and in which the frozen bodies are deposited by the nippers 38 striking a stationary nose 214 on the machine frame and being thereby automatically opened in the moment the frozen bodies have been moved down into the channel. A dog member 58, Fig. 7, adapted to be reciprocated by means of a piston 59 of a hydraulic motor 60 to be mentioned below, extends through a slot 57 in the bottom of the channel 56 into the interior of the latter and serves to displace the deposited frozen bodies in the direction of the arrow $P_2$ in Figs. 4 and 7. Over the distance $o$ in Fig. 7, the channel 56 is uniformly twisted through an angle of 90° so that the open side 61 of the channel is gradualy changed from horizontal to vertical position as shown in Figs. 4 and 7, whereby the frozen bodies 54 are caused to lie down which is convenient when the said frozen bodies are transferred from the channel to a belt conveyor or the like 62, as indicated at 54', from which conveyor the frozen bodies are subsequently removed in order to be packed.

It will be understood that at the points of the steel ring 39 situated vertically below the free ends of the cross arms $49_1$ and $49_2$, the said steel ring is apertured or split up so that the sliding rods 36 hanging in these arms can be lowered down through the steel ring 39. Apart from these apertured or split up zones of the ring 39 the rods 36 engage with the latter by means of rollers 36' at the lower ends of the respective rods 36.

Figure 10:
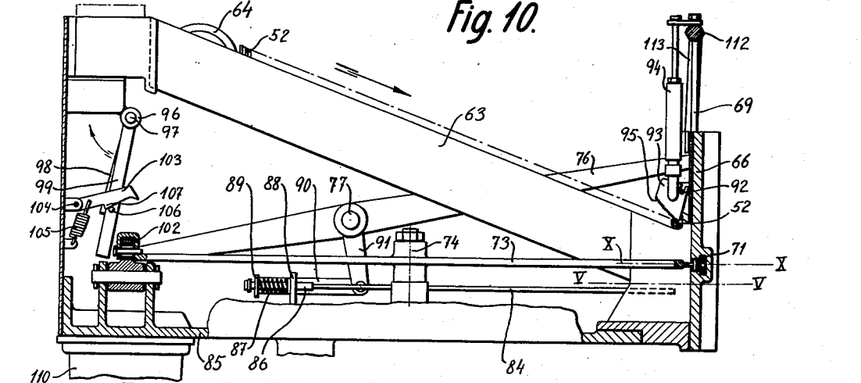
Fig. 10 illustrates an apparatus for inserting sticks into the frozen bodies in side view with parts in section along the line II—II of Fig. 11.
Figure 11:
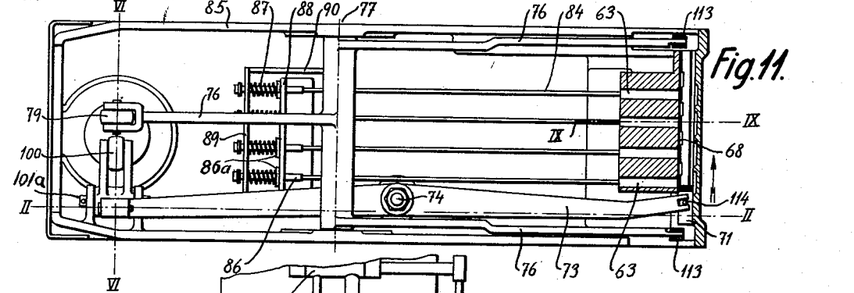
Fig. 11 is a plan view of same with parts in section along the line V—V of Fig. 10.
Figure 12:
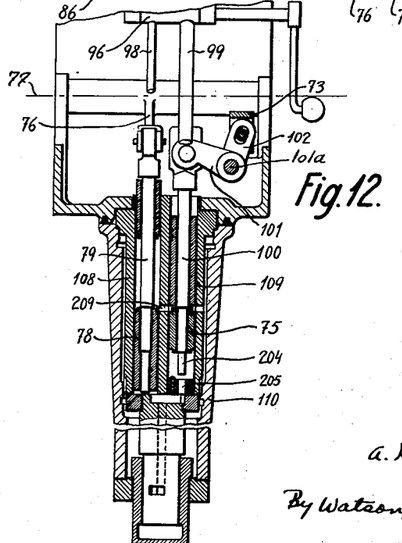
Fig. 12 is a vertical section along the line VI—VI of Fig. 11.
Figure 16:
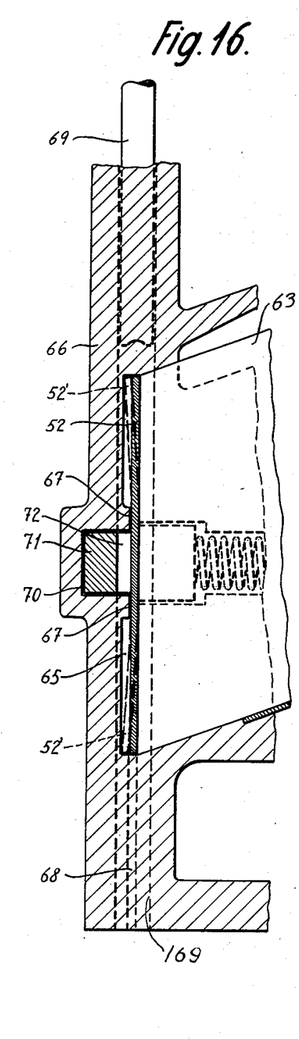
Figure 17:
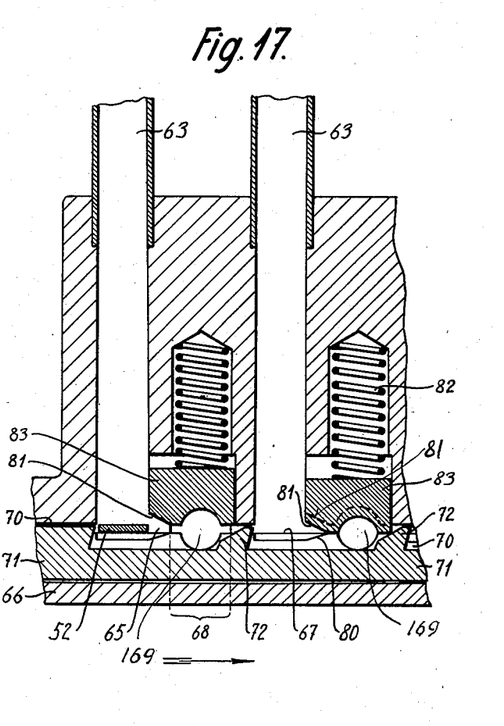

The stick inserting device 31, Fig. 1, is of substantially well known kind and is shown on a larger scale in Figs. 10–12. This device comprises a plurality (in the embodiment shown four), of inclined chutes 63, each of which contains a number of flat wooden sticks 52 in upright position. A heavy body e. g. supported on rollers serves to press the sticks in the direction of the arrow in Fig. 10 towards the lower end of each of the chutes 63 from where the sticks are pressed into a narrow chamber 65, Figs. 16 and 17 in the end wall 66 of the stick inserting device situated at the lower end of the chute. The lowermost stick 52, Fig. 16, in each of the chutes 63 is thereby pressed against an abutment surface 67 in the said chamber. Above and below this abutment 67 the chamber 65 has a width slightly greater than the thickness of the stick, so that possible curved or warped sticks 52', Fig. 16, may be accommodated in the chamber. In Fig. 17, the lowermost stick 52 is only shown in one of the chutes 63 illustrated in that figure.

After having been brought against the abutment 67, the stick is to be displaced in the direction of the arrow shown in Figs. 11 and 17 to a position above a slot 68, Figs. 16 and 17 at the bottom of the chamber 65, said slot having a width corresponding to that of the stick 52 and being located verticaly below a piston 69, Figs. 10 and 16, slidable in a vertical chamber 169, Figs. 16 and 17, in the wall 66. This is effected by means of a transverse feeding member in the form of a rack 71 slidably mounted in a horizontal groove 70 in the end wall 17 and provided at each of the grooves 63 with a tooth 72 engaging behind a side edge of the stick 52 resting against the abutment 57. This rack is moved in the direction indicated by the arrow in Figs. 11 and 17 by means of a double armed lever 73, Figs. 10 and 11 which is rotatable on a pivot 74 and is moved by means of a hydraulic piston 75, Fig. 3. By this displacement, which is effected in a manner to be described in the following with reference to Fig. 3, the stick 52, Figs. 16 and 17, is moved to a position above the slot 68 at the bottom of the chamber 65, whereafter the stick is pressed out through this slot and down into a body of cream in one of the freezing pockets located directly under the stick inserting device, the piston 69 being moved downwards by means of a lever 76, Figs. 10–12, which is rotatable about an axis 77, Fig. 3, and is moved by means of hydraulic piston 78, the piston rod 79 of which is connected with one end of the lever 76. Also the control of this movement will be described in the following with reference to the diagram in Fig. 3.

As is apparent from Fig. 17, the chamber 65 is contracted in the direction towards the slot 68 through which a stick 52 can be pushed down into a freezing pocket, cf. the inclined position of the lateral surfaces 80 and 81 of the chamber 65 leading to the slot 68. The object of these inclined surfaces 80 and 81 is to secure that a curved rod 52′, as shown in dotted lines in Fig. 16, will be straightened before being moved into the narrow zone of the chamber 65 situated below the expelling piston 69 and having a thickness approximately corresponding to that of the stick. A stick that has been moved to a position above the slot 68 will be kept in contact with the abutment 67, which also extends across the said slot, apart from the enlarged portion of the chamber 65 through which the piston 69 is moved, by means of a block 83 which is slidably mounted in the wall 66 and is constructed to form part of the inclined surface 81, said block being pressed in a direction towards the abutment 67 by means of a spring 82. When no stick is present between the said block 83 and the part of the abutment 67 facing same, the spring 82 will press the block into contact with the abutment 67, as shown in the right hand side of Fig. 17, from which position the block 83 is then pressed back by the stick 52 when the latter is subsequently moved to the right by the rack 71. For the purpose of illustration the block 83 in the left hand portion of Fig. 17 is shown in the withdrawn zone although there is no stick present above the slot 68.

Under each of the chutes 63, Figs. 10 and 11, serving to receive the sticks, a number of substantially horizontal, longitudinally slidable rods 84 are mounted, which at the end thereof facing the end wall 66 extend into the bottom of the chutes 63 and abut the lower end of one of the sticks present at the front end of the chute. At their other ends these rods are slidably mounted in a guide 88 mounted on the stationary frame 85 of the stick inserting device and provided with a guide collar 86 for each rod, the latter being provided inside the nut on the respective free ends with a common cross member 89 which by means of links 90 is connected with a cross arm 91 depending from the lever 76. Between the guide 88 and the cross member 89 a helical spring is disposed around each rod 84 and abuts a shoulder 86a of each collar 86, thereby tending to press the collars and thereby the rods 84 in the direction towards the wall 66.

At the upward movement of the piston 69 after the insertion of a stick into the body of cream, the cross arm 91 of the lever 76, during the rotation of the latter in a counterclockwise direction as viewed in Fig. 10, will compress the spring 87, whereby the rod 84 is subjected to a force tending to displace the rod longitudinally towards the sticks present at the lower end of the chute 63, said sticks being thereby pressed towards the wall 66. This contributes towards insuring that a new stick is always introduced into the chamber 65 during the upward stroke of the piston 69 upon completed insertion of a stick into a body of cream.

Above the lower end of each of the chutes of the stick inserting device there is arranged a member 93, Fig. 10, pivoted at 92 and coupled to the expelling pistons 69 in a point spaced from the pivot 92 by means of a longitudinally adjustable connection 94. The bottom edge 95 of this member facing the sticks is grooved or serrated and so located that when the pistons 69 are moved downwards, and the member 93 is thereby compelled to rotate about the pivot 92 in the counter-clockwise direction, the said edge is moved towards the top edge of the sticks adjacent to the wall 66, thereby contributing towards keeping the latest stick supplied to the chamber 65 reliably in contact with the abutment 67 along which the stick is subsequently guided to a position above the slot 68 as described above.

As will appear from the foregoing description, the displacement of a piston 69 should take place only after the rack 71 has displaced the sticks present in the chambers 4 at the end of each chute 63, and therefore the two levers 73 and 76 and consequently the rack 71 and the pistons 69 are hydraulically controlled in dependency on one another as will be described hereinafter, but in addition it will be advantageous to make such arrangements that if for some reason the piston 69 should not complete its downward movement to insert a stick into the body of cream, the stick inserting device is automatically blocked so that a new stick cannot be displaced into position above a slot 68 in which there may already be a stick present which has not been pushed completely out of the slot. For this purpose, the embodiment of the stick inserting device shown in Figs. 10–12 is constructed with a pivoted locking member 96, 98, 99 having a hub 96 pivoted at 97 for rotation above a horizontal axis relative to the frame of the stick inserting device, and two arms 98 and 99 associated with said hub and radially projecting therefrom. The arm 98 extends downwards at an angle into the path of movement of the vertical reciprocating piston rod 79 of the hydraulic piston 78 serving to operate the pistons 69, see Fig. 12, while the other arm 99 extends down towards the piston rod 100 of the piston 75 serving to rotate the lever 73 and thereby to move the rack 71. The piston rod 100 is connected by way of a crank lever 101, 102 pivoted at 101a with the end of the lever 73, and the locking member 96—99 is constructed in such a manner that the arm 99 under the influence of its own gravity will tend to swing into vertical position in the path of movement of the piston rod 100 or of the lever arm 101 connected therewith, but is normally prevented from assuming this position and is instead locked by a pawl 103 which is rotatable about a pin 104 on the stationary part of the stick inserting device and is pressed by means of a spring 105 towards a projection 106 on the arm 99, provided the piston 78 during the performance of its operating stroke to insert sticks into the bodies of cream by means of the pistons 69 completes its upward stroke and consequently pushes the sticks in question completely out of the slots 68. In that case, the piston rod 79 during its upward stroke will push the arm 98 so far to the side that the locking arm 99 rigidly connected with the arm 98 is turned so far away from the blocking position for a subsequent movement of the piston 75 that the pawl 103 slides down on the projection 106 and thereby prevents the arm 99 from being swung back to the locking position during the downward movement of the piston 78 and its piston rod 79.

If for some reason, e. g. if a stick is jammed in the slot 68, or is not moved to a position exactly above the latter, the piston 78 is prevented from completing its stroke, it will not push the arm 98 sufficiently far to the side to enable the pawl 103 to retain the locking member, which consequenly during the return movement of the piston assumes the locking position for the piston 75.

Each of the pistons 75 and 76 is mounted in a cylinder 108 and 109, Fig. 12 respectively, said cylinders being provided in a common carrying member 110 the stick inserting device 31 as a whole being arranged on an arm 111 rotatable about the post 2, Fig. 2.

The four pistons 69 are connected with each other at their upper ends by means of a cross member 112, Figs. 2 and 10 which at its ends is connected with the lever 76 by means of links 113. The lever 73 co-operates with the rack 71 by engaging around a piston 114 provided on the rack 71.

The filling and portioning device, as previously mentioned, is provided with a measuring member 25 which by way of a gear train 115 in a gear box 116 is driven by an electric motor 117, Fig. 3. This motor is coupled by way of a worm drive 118a and a clutch coupling 119, Fig. 3, to a driving shaft 120 of the gear train 115. By means of this gear train, the measuring member 25 is driven, the hub 117 on the driven gear wheel in this gear train carrying an eccentric 118 which in known manner serves to impart a vertically reciprocating movement to the rods 28 by means of which the pistons 27 in the measuring chambers are displaced to supply cream to the freezing pockets, and on the said eccentric there is arranged a pawl 122 rotatable about a pivot 121 and co-operating with a ratchet wheel 123 arranged on a shaft 124. The shaft 124 is directly coupled to the measuring member 25. The pawl 122 is kept in engagement with the ratchet wheel 123 by means of a spring 125, Fig. 14, but during the rotary movement of the eccentric 118 a nose 122a on the pawl 122 is moved against a stationary pin 127 in a stationary housing 128, the said pin pressing the pawl out of engagement with the ratchet wheel 123 in the moment the measuring member has been turned through 180° about the axis 24 from the filling position shown in Fig. 13. The rotation of the measuring member is then automatically stopped and is not resumed until, during continued slow rotation of the eccentric 118, the pawl 122 engages a subsequent tooth of the ratchet wheel 123 and thereby turns the latter and hence the measuring member 180°, the ratchet wheel being provided with only two teeth spaced at 180° from one another. In this manner, for each full revolution of the eccentric 118, there is only effected a rotation of the measuring member 25 through 180°. The filling device is carried by a post 132 resting on the machine frame 48. 126 is a pin slidably mounted in one end wall of the housing 128 and adapted, if moved downwards in the housing 128, to move into the path of movement of the nose 122a on the pawl, when the latter has been moved to the position in which it would otherwise engage the ratchet wheel as above described. By pressing the pin 126, it is consequently possible to prevent the pawl from engaging the ratchet wheel and thus to set the measuring device out of operation.

The rotary movement of the measuring member and the consequent supply of cream to the freezing pockets must be coordinated with the movement of the freezing pockets in such a manner as to take place in periods of rest between successive steps of the movement of the freezing trough, and for this purpose, the driving motor 117 of the measuring device is also used for driving a circulation pump 135 in the hydraulic driving system for the above described parts of the device, such as illustrated in Fig. 3. The motor 117 is coupled by way of a gear 229 to the operating shaft 129 of a cam 131 serving to operate a hydraulic valve 130 of the hydraulic system shown in Fig. 3, which system serves to control all of the above described devices with the exception of the measuring device.

The motor 117, which by means of a belt drive 133 is coupled to the worm 118a, is coupled by means of another belt drive 134 to a circulation pump 135 for oil drawn by the pump from an oil reservoir and used for controlling the take-off device, the stick inserting device and the freezing trough. The said pump is connected by way of a conduit 138 to a pressure reservoir 137, from which oil under pressure is fed through a pressure conduit 140 to an admission opening 139 of the valve 130. The pressure reservoir has a piston 141 biased by a spring 142 which opposes the oil pressure set up in the pressure reservoir by the oil pump 135 and, if the oil pressure falls below a certain limit, cuts off the admission of pressure oil to the valve 130, whereby the hydraulic operation of the take-off device, the freezing trough and the stick inserting device is stopped, the piston 141 being then displaced so much under the influence of the spring 142 that it closes the discharge opening 143 of the pressure reservoir, to which the pressure conduit 140 is connected.

The connecting conduit 138 between the oil pump 135 and the pressure reservoir 137 is connected to a hydraulic safety valve 144 preventing the hydraulic pressure in the pressure reservoir 137 and in the conduits 138 and 140 from exceeding a predetermined value, the piston 145 of this safety valve being in that case pressed so far back against the action of a spring 146 that the piston 145 opens a passage 147 through which the pressure oil circulated by the oil pump 135 may flow back to the reservoir 136.

Figure 15:
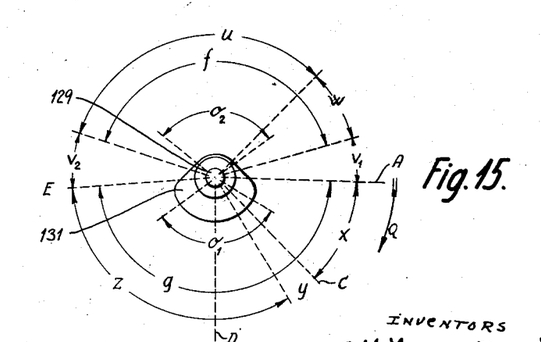
Fig. 15 is a diagram showing the operating intervals of the various devices of the machine during one revolution of a cam serving to operate the main control valve of the hydraulic circuit, Fig. 16, on a larger scale, is a vertical section along the line IX—IX of Fig. 11 through one end wall of the stick inserting device, and Fig. 17, likewise on a larger scale, is a horizontal section through part of the same end wall of the stick inserting device along the line X—X of Fig. 10.

The manner in which the above mentioned parts of the machine, viz. the freezing trough, the stick inserting device, and the take-off device, are controlled relative to one another will best be understood from the following description of the operation of the hydraulic system shown in Fig. 3 during a full revolution of 360° of the cam 131 starting from a position corresponding to that indicated by the dotted line A in Fig. 15, and in which the cam during its rotation in the direction of the arrow Q in Fig. 15 just starts to open the main valve 130, Fig. 3, to allow the driving medium to flow from the conduit 140 to the conduit 148. The speed at which the cam 131 is rotated may e. g. be 18 revolutions per minute. The ratio of the gear transmissions 115 and 229 is e. g. so selected that the measuring member 25, Fig. 13, is turned through an angle of 180° each time the cam 131 performs a full revolution. The two coupling halves of the coupling 119 are so arranged relative to one another in the direction of rotation of the shaft 120 that a rotation of the measuring device 25 through an angle of 180° from the filling position shown in Fig. 13 to the discharging position will only be started when the rotation of the freezing trough caused by rotation of the cam 131 from the position A, Fig. 3, has been completed, or in other words only after the cam 131 has passed the position C, Fig. 3, to be mentioned in more detail hereinafter.

In Fig. 3, the cam is shown in a position corresponding to that indicated by the dotted line D in Fig. 15, but this is not essential for the explanation given below. It is observed that in the angular zone indicated at $c_1$ in Fig. 15, the cam 131 and the valve 130 are kept in full open position for the connection between the conduits 140 and 148, and in the angular zone indicated at $c_2$, the spring 206, Fig. 3, of the main valve 130 keeps the latter in a position in which the conduit 140 is in communication with the pipe 172 through the valve 130.

When the cam 131 moves through the position A in Fig. 15, pressure oil starts to flow from the conduit 140, Fig. 3, through valve 130 to a conduit 148 and from there through the conduit 150 and through the piston valve 151, the piston 183 of which occupies a position in which said piston blocks the hydraulic connection from the conduit 150 through the valve 151 and conduits 153, 154 to the piston 43 of the take-off device and to the pistons 75 and 78 of the stick inserting device. The conduit 150 then communicates with conduit 152 through the valve 151 which conduit 152 is connected to one end of the cylinder of the hydraulic motor 11 serving to rotate the gear wheel 10, the pressure oil flowing from the conduit 152 through a passage 162 in the left-hand cylinder end (as viewed in Fig. 3) to a passage 166 extending axially through the left hand portion of the piston 163 of this motor, said passage opening between a piston 164 in a cylinder 168 integral with the piston 163 and extending crosswise thereof. The piston rod of the piston 164 carries a coupling member 165 in the form of a rack which by means of the piston 164 is moved into engagement with the gear wheel 10 when the pressure medium supplied through the passage 166 displaces the piston 164 towards the gear wheel 10, or in other words from the position shown in Fig. 3 to that indicated in Fig. 4. Towards the end of this displacement of the piston 164, the latter opens another passage 167 extending axially through the left hand portion of the piston 163, whereby pressure medium flows from the cylinder 168 through the passage 167 to the cylinder end of the motor 11 located in the left-hand side in Fig. 3 and at the bottom in Fig. 4. The piston 163 is consequently displaced in the direction indicated by the arrow $P_{11}$ in Figs. 3 and 4, whereby the member 165, which as above mentioned has previously been moved into engagement with the gear wheel 10, rotates the latter through an angle corresponding to the piston stroke of the motor 11. This movement is so selected that by the consequent rotation of the drum 35 of the take-off device, which drum is directly connected with the gear wheel 10 as illustrated in Fig. 5, the sliding rods 36 in engagement with the lifting arms 49, $49_1$ and $49_2$ before the commencement of this rotary movement are now moved out of engagement with the said lifting arms, while the sliding rods 36 with apurtenant radial arms 37 immediately following in the direction of rotation are moved into engagement with the lifting arms 49, $49_1$ and $49_2$. In the embodiment shown in Fig. 1, the take-off device has sixteen sliding rods 36, and the step-wise rotation of the drum 35 should therefore be one sixteenth of a full revolution. Simultaneously with the drum 35, the gear wheel 10 rotates the freezing trough about the axis 30 through an angle corresponding to the angular spacing of two successive radial rows of freezing pockets.

During the said displacement of the piston 163 of the motor 11, such pressure medium as may be present at the right hand end of the cylinder of that motor will be driven out of the cylinder through a passage 174 in the right hand half of the piston 163, a cross bore 175 of the piston 163 communicating with the passage 174, and a longitudinal passage 177 in the relevant end of the cylinder, the said pressure medium flowing however, in the beginning directly to the passage 177 through a side opening 176 which is so arranged in the cylinder wall as to communicate with the cross bore 175 of the piston 163, when the latter has completed its movement to the right. From the passage 177, the pressure medium thus extruded is pressed through a conduit 169 into a conduit 170, from which the pressure medium flows through the conduits 171 and 172, the valve 130 and a return conduit 173 to the pressure oil reservoir 136.

The above described movement of the piston 163 and the consequent stepwise rotation of the freezing trough and the drum 35 is completed during the time the cam rotates through the angle $x$, Fig. 15, that may e. g. extend over an arc of about 45°. When the piston 163 has completed the said movement, the pressure oil still flowing to the motor 11 through the conduit 152 will flow off through a side opening 200 and a passage 201 in the cylinder wall of the motor 11 communicating therewith, and thence through a conduit 182 to one end of the valve 151, whereby the valve member 183 of the latter is displaced from the position shown in Fig. 3 to the position in which a side opening 202 in the housing of this valve is brought in direct communication with the conduits 150 and 152 through the valve. This operation of the valve 151 takes place during the movement of the cam through the angular zone $y$, Fig. 15, that may e. g. extend over 15°.

During the said movement of the cam through the angular zone $x$, Fig. 15, pressure oil has also flown from the conduit 148 through a conduit 149 to the cylinder 60, which is axially slidable relative to a stationary piston 59 situated therein. The cylinder 60 is thereby displaced to the right in Fig. 3, whereby the dog member 58 in the channel 56 is likewise displaced to the right. Pressure medium that may be present in the left hand end of the cylinder 60 is driven through an opening 59' into the hollow piston rod of the piston 59, and thence into a conduit 170 connected thereto, and thence again through the conduit 171, the valve 130 and the return conduit 173 to the oil reservoir 136. During continued rotation of the cam through the angle $z$, Fig. 15, that may e. g. extend over about 115°, pressure oil flows from the conduit 150, Fig. 3, via the valve 151 to the conduit 153, from where the oil flows through the conduit 156 into the bottom of a cylinder 158, Figs. 3 and 6, having a piston 157 serving to move the scoop 159 up and down so that the latter, which is first immersed in the vessel 53, Figs. 4 and 6, containing the coating material, is lifted to the position shown in Fig. 6, in which the scoop is in a level such that the frozen bodies depending from the nippers 38 on the arm 37 in the particular moment seized by the lifting arm 49, Fig. 4, may be moved down into the scoop. From the conduit 153 pressure medium also flows simultaneously through a conduit 154 and a conduit 155 to the top end of the cylinder 44, whereby the piston 43 of the latter is moved down to lower the lifting rod 42. Moreover, pressure oil flows at the same time through the conduit 154 to the bottom of the cylinder, in which the piston 75 for moving the lever 73 is arranged. The piston 75 is thereby moved upwards, whereby the rack 71, Figs. 11, 16, and 17, pushes a stick into position above the slot 68, and when this displacement has been completed and the piston 75 has thereby moved a pin 204, Fig. 12, projecting axially from the bottom end of the piston out of a bottom opening 205 of the cylinder 109, pressure medium flows from the said cylinder through the said bottom opening to the space below the piston 78, Figs. 3 and 12, of the cylinder 108, whereby the lever 76 is rotated in such a manner that the expelling piston 69 is moved downwards to push the said stick out through the slot 68.

When the cam has rotated through the angle $z$ and passes through the position E, a spring 206 displaces the control valve in such a manner that during continued rotation of the cam through the angular zone $v_2$, Fig. 15, this valve is kept closed to the flow of pressure medium from the conduit 140 to both of the conduits 148 and 172.

During continued rotation of the cam into and through the angular zone $u$, Fig. 15, extending over about 125°, the spring 206 displaces the valve 130 in such a manner that the conduit 140 is brought into communication with the conduit 172, while the conduit 148 is brought into communication with a conduit 207 communicating with the return conduit 173. From the conduit 140 pressure medium then flows through the conduit 172 to the conduit 208 and thence to the top end of the cylinder 158, whereby the piston 177 is moved back to the position shown in Fig. 3 to immerse the scope 159 into the vessel 53, while at the same time expelling the pressure medium received in the beforegoing phase through the conduits 156 and 153 to the opening 202 of the valve 151 and thence through the conduit 150 and the return conduits 207 and 173. At the same time, pressure medium flows from the conduit 172 through the conduit 171 to the top end of the cylinder 108, in which the piston 78 is present, and also through the conduit 170 to the left hand end of the cylinder 60. This cylinder is thereby displaced in the direction of the arrow $P_3$ in Fig. 3 to impart a motion to the dog member 58, whereby the discharged frozen bodies are likewise moved in the direction of the arrow $P_3$ along the channel 56. The piston 78 is moved downwards to draw the expelling piston 69 back from its lowered position, and when the piston 78 has reached its bottom position, pressure medium flows through a side opening 209, Figs. 12 and 3 in the cylinder of that piston to the space above the piston 75 to move the latter downwards, whereby the rack 71 is moved back to its starting position.

At the same time, pressure oil flows from the conduit 170 through the conduit 169 and the passage 177 to the opening 176, and thence through the opening 175 of the piston 163 registering with the opening 176. From the opening 175, the pressure oil flows in both directions in the passage 174 and partly tends to flow to the right hand end of the motor 11 to drive the piston 163 back to the position shown in Fig. 3, but is prevented from so doing by the plunger 178 to be mentioned below, and partly flows to the left through the passage 174 to an opening 190 above the piston 164 which at this moment is in the position shown in Fig. 4, i. e. a position in which the rack 165 meshes with the gear wheel 10. Consequently, the piston 164 is displaced and withdraws the rack 165 from the gear wheel 10, as illustrated in Fig. 3. During this movement, the piston 164 uncovers a side opening 180 of the cylinder 168, whereby pressure medium that has flowed to the space above the piston 164 flows through the said side opening into the axial passage 181 in the right hand half of the piston 163 indicated in dotted lines in Figs. 3 and 4 and thence into the right-hand end of the cylinder of that piston. The piston 163 is thereby driven back to the starting position shown in Fig. 3.

To prevent this return movement of the piston 163 from being initiated before the rack 165 has been withdrawn from engagement with the gear wheel 10, an axially disposed plunger 178 is arranged at the end of the cylinder of the piston 163, towards which this piston moves during the rotation of the gear wheel 10, said plunger being adapted, when the piston 163 has moved to the said cylinder end, to completely or partially close the end of the passage 174 opening in the cylinder end in question and thereby to prevent the oil flowing into this passage from the conduit 169 from flowing to the said cylinder end to force back the piston 163 until sufficient pressure oil has flowed through the passage 174 to the cylinder 168 to withdraw the piston 164.

The pressure oil, which during the previous stroke of the piston 163 had flowed to the left-hand portion of the cylinder of that piston, is during the return stroke pressed into the conduit 152, and thence by way of the valve 151 back to the conduit 150, and flows from the latter by way of the main valve 30 to the conduit 207, and thence again through the return conduit 173 to the oil reservoir 136.

Simultaneously with these return movements of the pistons 157, 163, 78 and 75, pressure oil flows from the conduit 171 into the bottom of the cylinder 44 through the conduit 210. The piston 43, which at this time is at the bottom of this cylinder, see Fig. 5, is now pressed upwards and thereby pushes the lifting rod 42 and consequently the sliding rods 36 engaged by the lifting arms $49_1$ and $49_2$ upwards, whereby the frozen bodies gripped by the nippers on the sliding rod 36, which is lifted by the arm 49, are withdrawn from the freezing pockets, while at the same time the frozen bodies depending from the nippers on the sliding rod 36 seized by the lifting arm $49_2$ are lifted preparatory to being moved towards the channel 56.

During the upward stroke of the piston 43, the pressure oil, which previously had driven the piston 43 downwards, is pressed out through the conduit 155, from which this pressure oil flows by way of the conduit 153, the interlocking valve 151 and the main valve 130 to the return conduit 173. When the piston 43 has moved to its top position, Fig. 3, the pressure oil in the cylinder 44 is admitted through a side opening 211 of that cylinder to a by-pass conduit 212, through which pressure oil then flows to an opening 213 at the left hand end of the cylinder of the valve 151, whereby the pressure oil displaces this valve to the position shown in Fig. 13. This is effected while the cam moves through the angular zone $w$ in Fig. 15. Thereby all parts of the apparatus have been restored to their starting positions.

Immediately before the cam 131 during its continued rotation passes into the angular zone $w_1$, Fig. 15, the cam initiates another operation of the valve 130 and during its rotation through the zone $w_1$ keeps both pressure conduits 172 and 148 barred from connection with the pressure conduit 140, viz. until the cam has again moved to the position A and thereby initiates another cycle exactly similar to that described.

The operation of the interlocking valve 151 by the overflow of pressure medium from the cylinder 44 of the lifting piston 43 of the take-off device ensures that no pressure medium can be supplied to the motor 11, and consequently no rotation of the freezing trough or the drum of the take-off device can be effected until the discharging nippers and also the expelling piston 69 have been restored from their lowered positions.

The above mentioned supply chamber 4 for the coating fluid is surrounded by a heating jacket 213, which e. g. by the supply of hot water keeps the coating material in a suitably liquid state.

The cross arm 49₁, as before mentioned, serves to lower the frozen bodies hanging in the radial arm 37, Figs. 7 and 8, which has been moved into a position above the freezing trough 56, towards the latter. When this takes place, a stationary stop member 214, Fig. 7, on the supporting post of the take-off device will be struck by a radially projecting pin 215, Figs. 5, 7, and 9, on a rod 216 having two mutually co-axial pins 217 arranged in staggered relationship to the pin 215 and each mounted in an arm 218 extending from the arm 37. When the arm 37, Figs. 7 and 8, with the frozen bodies 54 depending therefrom is lowered towards the trough, the pin 215 strikes the abutment 214 and thereby causes the rod 216 to rotate about the pins 217, whereby the rod 216, which extends through a strap 219, Fig. 8, on one branch of each of the pairs of nippers 38 associated with the arm 37 in question tends to lift these nippers. The jaws 230, Fig. 8, of the nippers, which are individually suspended on an arm 220 rotatable about the cross arm 237 will thereby turn these two arms away from one another, whereby the jaws are opened by being forced away from one another by the pressure which the rod 216 exerts against the upper end of the strap 219. The nippers consequently leave hold of the sticks 52 up to then gripped by the nippers.

In Figs. 7 and 8, are shown a number of rotatable flat lateral supports 260 for the frozen bodies deposited in the channel 56. Each of these lateral supports is fixed to an arm 262 rotatable about a shaft 261, Fig. 8, each of said supports being kept in the position shown in Fig. 8 by means of a spring 263, in which position the lateral supports 260 extend into the discharge channel through slots in the side wall thereof. The dog member is carried by an arm 264 on the cylinder 158, and on this arm there is provided a rack 265 meshing with a gear wheel 266 on a shaft 267 which is coupled to the shaft 261, e. g. by means of a gear not shown, in such a manner that upon displacement of the cylinder 158 in the direction of the arrow P₃, Fig. 3, when said cylinder is to displace the dog member 56 longitudinally of the channel, the shaft 261 is automatically turned in such a manner as to swing the lateral supports 260 out of the channel 56, so that they no longer form an obstruction to the travel of the deposited frozen bodies in the channel 56.

Instead of using the machine for the freezing of bodies of cream, it may be used for the freezing of bodies of any other liquid or semi-liquid materials such as fruit juice mixtures for solutions of nutriments or stimulants of any kind.

We claim:

1. A refrigerating apparatus for freezing fluid material into shaped bodies comprising an annular rotary vessel, which has means constituting a number of annular rows of freezing pockets and is separated into a plurality of segments, pipes for alternately supplying a cooling medium and a thawing medium to each of said segments, means for filling portions of said fluid material into said pockets, a device for inserting sticks into the material in said pockets, a take-off device for removing the frozen bodies from said pockets and including a rotary member, arranged immediately outside the periphery of the said vessel to be rotated about an axis parallel to the axis of rotation of the said vessel and having a plurality of circumferentially spaced take-off bars slidably mounted in said rotary member, a source of a hydraulic pressure medium, a primary hydraulic motor operatively connected for rotating said rotary member, means mechanically intercoupling the rotary member of the said take-off device and said rotary vessel to cause said rotary vessel to be driven stepwise from the rotary member of said take-off device, a secondary hydraulic motor operatively connected for shifting said take-off bars axially in relation to the rotary member of said take-off device and a hydraulically operated valve controlling the supply of hydraulic pressure medium to said hydraulic motors so as to cause said motors to operate alternately.

2. A refrigerating apparatus for freezing fluid material into shaped bodies comprising means constituting a number of annular rows of freezing pockets carrying said pockets being rotatable along with said vessel, walls dividing the interior of said vessel into a plurality of segments, pipes for alternately and successively supplying a cooling medium and a thawing medium to each of said segments, a device for filling portions of said fluid material into said pockets, a device for inserting holding sticks into the material in said pockets, a take-off device for removing the frozen bodies from said pockets and including a rotary member, arranged immediately outside the periphery of the said vessel to be rotated about an axis parallel to the axis of rotation of the said vessel and having a plurality of circumferentially spaced axially disposed take-off bars slidably mounted in said rotary member, a radially disposed arm attached to each of said bars and a lifting rod slidably mounted in said rotary member coaxially to same, a source of a hydraulic pressure medium, a primary hydraulic motor operatively connected for stepwise rotating said rotary member, means mechanically intercoupling the rotary member of said take-off device and said rotary vessel to cause said rotary vessel to be rotated stepwise from and simultaneously with said rotary member, a secondary hydraulic motor operatively connected for shifting said lifting rod axially in relation to said rotary member and means controlling the supply of hydraulic pressure medium to said primary and secondary hydraulic motors so as to cause said motors to operate alternately.

3. A refrigerating apparatus as in claim 1 and further comprising a separate hydraulic motor operatively connected to the stick inserting device, means being provided for admitting hydraulic medium simultaneously to said separate hydraulic motor and said secondary hydraulic motor.

4. A refrigerating apparatus for freezing fluid material into shaped bodies comprising means constituting a number of annular rows of freezing pockets, an annular rotary vessel carrying said pockets being rotatable along with said vessel, walls dividing the interior of said vessel into a plurality of segments, pipes for alternately and successively supplying a cooling medium and a thawing medium to each of said segments, a device for filling portions of said fluid material into said pockets, a device for inserting holding sticks into the material in said pockets, a take-off device for removing the frozen bodies from said pockets and including a rotary member, arranged immediately outside the periphery of the said vessel to be rotated about an axis parallel to the axis of rotation of the said vessel and having a plurality of circumferentially axially disposed take-off bars slidably mounted in said rotary member, a radially disposed arm attached to each of said bars and a lifting rod slidably mounted in said rotary member coaxially to same, a number of nippers on each arm for gripping the sticks of frozen bodies in a corresponding number of said pockets, a cross arm carried by said lifting rod and extending radially towards the periphery of said vessel, an incision in the end of said cross arm to engage with the upper end of that one of said take-off bars being at any movement during the rotation of said rotary member positioned next to said vessel, a primary hydraulic motor operatively connected for rotating said rotary member, means mechanically intercoupling the rotary member of the said take-off device and said rotary vessel to cause said rotary vessel to be driven stepwise from the rotary member of said take-off device, a secondary hydraulic motor operatively connected for shifting said lifting rod axially in relation to the rotary member of said implement and a hydraulically operated valve controlling the supply of hydraulic pressure medium to said hydraulic motors so as to cause said motors to operate alternately.

5. A refrigerating apparatus for freezing fluid material into shaped bodies comprising an annular rotary vessel, which has means constituting a number of annular rows of freezing pockets and is separated into a plurality of segments, pipes for alternately supplying a cooling medium and a thawing medium to each of said segments, means for filling portions of said fluid material into said pockets, a device for inserting sticks into the material in said pockets, a take-off device for removing the frozen bodies from said pockets and including a rotary member, arranged immediately outside the periphery of the said vessel to be rotated about an axis parallel to the axis of rotation of the said vessel and having a plurality of circumferentially spaced take-off bars slidably mounted in said rotary member, a source of a hydraulic pressure medium, a primary hydraulic motor operatively connected for rotating said rotary member, means mechanically intercoupling the rotary member of the said take-off device and said rotary vessel to cause said rotary vessel to be driven stepwise from the rotary member of said take-off device, a hydraulically operated coupling member coupling said primary hydraulic motor to the rotary member of said take-off device, a secondary hydraulic motor operatively connected for shifting said take-off bars axially in relation to said rotary member and means for controlling the supply of hydraulic pressure medium to said primary and secondary hydraulic motors so as to cause said motors to operate alternately, the said rotary vessel and said rotary member of the take-off device being provided with interengaging teeth for intercoupling said vessel and said rotary body.

6. A refrigerating apparatus for freezing fluid material into shaped bodies comprising an annular rotary vessel, which has means constituting a number of annular rows of freezing pockets and is separated into a plurality of segments, pipes for alternately supplying a cooling medium and a thawing medium to each of said segments, means for filling portions of said fluid material into said pockets, a device for inserting sticks into the material in said pockets, a take-off device for removing the frozen bodies from said pockets and including a rotary member, arranged immediately outside the periphery of the said vessel to be rotated about an axis parallel to the axis of rotation of the said vessel and having a plurality of circumferentially spaced take-off bars slidably mounted in said rotary member, a source of a hydraulic pressure medium, a primary hydraulic motor operatively connected for rotating said rotory member, means mechanically intercoupling the rotary member of the said take-off device and said rotary vessel to cause said rotary vessel to be driven stepwise from the rotary member of said take-off device, a secondary hydraulic motor operatively connected for shifting said take-off bars axially in relation to the rotary member of said take-off device and a hydraulically operated valve controlling the supply of hydraulic pressure medium to said hydraulic motors so as to cause said motors to operate alternately, the said rotary vessel and the rotary member of said take-off device being provided with inter-engaging teeth for intercoupling said vessel and said rotary body.

7. A refrigerating apparatus according to claim 5, the said primary hydraulic motor being provided with a hydraulic piston and an hydraulically operated toothed coupling member for coupling said piston to the teeth of said rotary body.

8. A refrigerating apparatus as in claim 5 in which the primary hydraulic motor comprises a primary cylinder, a primary piston slidably therein, an auxiliary cylinder carried by said primary piston and extending crosswise thereof, an auxiliary piston slidable in said auxiliary cylinder and carrying said coupling member, said auxiliary cylinder being connected to the source of hydraulic pressure by way of the primary cylinder and piston.

9. A refrigerating apparatus as in claim 5 in which the primary hydraulic motor comprises a primary cylinder, a primary piston slidably therein, an auxiliary cylinder carried by said primary piston and extending crosswise thereof, an auxiliary piston slidable in said auxiliary cylinder and carrying said coupling member, said auxiliary cylinder being integral with the primary piston and connected to the source of hydraulic pressure by way of the primary cylinder and piston.

10. A refrigerating apparatus as in claim 5 in which the primary hydraulic motor comprises a primary cylinder, a primary piston slidably therein, an auxiliary cylinder carried by said primary piston and extending crosswise thereof, an auxiliary piston slidable in said auxiliary cylinder and carrying said coupling member, said auxiliary cylinder communicating with the admission openings of the primary cylinder through passages extending axially through the primary piston, an axially extending plunger being provided at the end of the primary cylinder towards which the primary piston moves to turn the rotary vessel and the rotary body of the take-off device, said plunger being located in line with a passage of the primary piston through which, upon arrival of the primary piston at the said end of the primary cylinder, hydraulic medium is conducted to the auxiliary cylinder from a side opening of the primary cylinder, a cross bore being provided in the primary piston communicating with said side opening, said plunger being arranged to be received in the said passage towards the end of the stroke of the primary piston.

11. A refrigerating apparatus as in claim 1 in which the device for filling fluid material into the freezing pockets consists of a supply container for the material to be frozen, a substantially cylindrical measuring chamber mounted for rotation about a horizontal axis, adjacent the bottom of said container, said measuring member being constructed with a plurality of cylindrical measuring chambers extending crosswise therethrough, a piston slidably mounted in each of said measuring chambers, a continuously rotating motor, a gear transmission and a coupling connection between said motor and said measuring member and so arranged as to periodically rotate the latter through an angle of 180° to bring said measuring chambers into inverted position with said pistons at the top ends thereof, means mounted in said supply container for pushing said pistons down through said measuring chambers when in said position, said means being operatively connected to said motor, said coupling connection extending through a downwardly open chamber provided between said supply container and said gear transmission.

References Cited in the file of this patent

UNITED STATES PATENTS

| 2,155,995 | Robb | Apr. 25, 1939 |
| 2,246,941 | Hoyer | June 24, 1941 |
| 2,442,146 | Reagin | May 25, 1948 |